Figure 1:
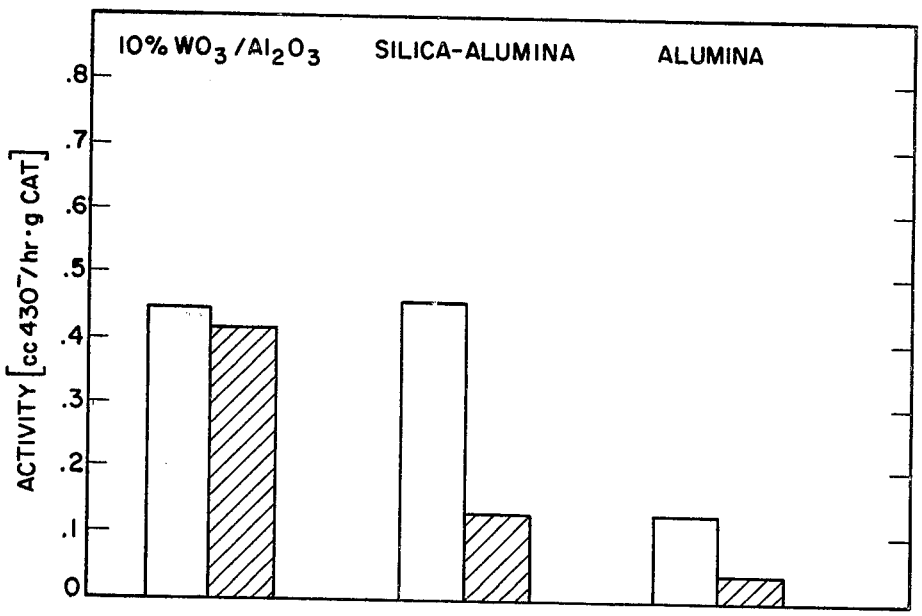

United States Patent [19]

Grenoble et al.

[11] 4,269,737

[45] May 26, 1981

[54] METHOD FOR PREPARING A GROUP IVB, VB OR VIB METAL OXIDE ON INORGANIC REFRACTORY OXIDE SUPPORT CATALYST AND THE PRODUCT PREPARED BY SAID METHOD

[75] Inventors: Dane C. Grenoble, Plainfield; Chang J. Kim, Somerset; Lawrence L. Murrell, Elizabeth, all of N.J.

[73] Assignee: Exxon Research & Engineering Company, Florham Park, N.J.

[21] Appl. No.: 82,316

[22] Filed: Oct. 5, 1979

Related U.S. Application Data

[63] Continuation-in-part of Ser. No. 927,829, Jul. 25, 1978, abandoned.

[51] Int. Cl.³ .......................... B01J 23/20; B01J 23/24
[52] U.S. Cl. .................................. 252/464; 252/456; 252/458; 252/457; 252/465; 252/469
[58] Field of Search ............... 252/463, 464, 465, 458, 252/455 R, 432, 461, 467, 469

[56] References Cited

U.S. PATENT DOCUMENTS

| | | | |
|---|---|---|---|
| 2,124,567 | 7/1938 | Grosse | 252/463 X |
| 2,273,338 | 2/1942 | Thomas | 252/463 |
| 2,396,641 | 3/1946 | Connolly | 252/465 X |
| 2,849,383 | 8/1958 | Hirschler et al. | 252/458 |
| 2,888,395 | 5/1959 | Henny | 208/111 |
| 3,108,063 | 10/1963 | Ch'in et al. | 208/354 |
| 3,530,194 | 9/1970 | Quik et al. | 260/672 |
| 3,649,707 | 3/1972 | Lester | 260/672 |
| 3,726,791 | 4/1973 | Kimberlin, Jr. et al. | 208/127 |
| 3,812,196 | 5/1974 | Uchiyama et al. | 260/672 |
| 3,985,641 | 10/1976 | Finch et al. | 208/121 |

*Primary Examiner*—Carl F. Dees
*Attorney, Agent, or Firm*—Edward M. Corcoran

[57] ABSTRACT

An acid catalyst comprising a catalytic component selected from the group consisting of oxides of tungsten, niobium and mixtures thereof and tungsten or niobium oxides in combination with one or more additional metal oxides selected from the group consisting of tantalum oxide, hafnium oxide, chromium oxide, titanium oxide and zirconium oxide on an inorganic refractory oxide support is prepared by depositing by means known in the art a metal oxide precursor salt on an inorganic refractory metal oxide which is not itself an acid cracking catalyst or by intimately mixing a metal oxide precursor salt with a refractory metal oxide support precursor salt, converting the salt or salts to the respective metal oxides and subjecting the resultant combination to steaming at elevated temperatures prior to use. Catalysts prepared in this manner exhibit enhanced activity and selectivity as compared to conventional acid catalysts. They also exhibit remarkable resistance to coke make.

65 Claims, 3 Drawing Figures

EFFECT OF STEAMING ON ACTIVITY FOR
CRACKING ETLGO AT 1 HOUR ON OIL $T = 950°F$ $P_T \sim 3$ ATM $P_{H_2O} \sim 2.8$ ATM $(WHSV)_{OIL} = 1.4 HR^{-1}$

METHOD FOR PREPARING A GROUP IVB, VB OR VIB METAL OXIDE ON INORGANIC REFRACTORY OXIDE SUPPORT CATALYST AND THE PRODUCT PREPARED BY SAID METHOD

CROSS-REFERENCE TO RELATED APPLICATIONS

The instant application is a continuation-in-part application of Ser. No. 927,829, filed July 25, 1978, now abandoned.

BRIEF DESCRIPTION OF THE INVENTION

An acid catalyst comprising a catalytic component selected from the group consisting of oxides of tungsten, niobium and mixtures thereof and tungsten or niobium oxides in combination with one or more additional metal oxides selected from the group consisting of tantalum oxide, hafnium oxide, chromium oxide, titanium oxide and zirconium oxide, preferably tungsten and niobium oxide on an inorganic refractory oxide support is prepared by depositing by means known in the art a metal oxide precursor salt on an inorganic refractory metal oxide which is not itself an acid cracking catalyst under conditions normally employed in the art or by intimately mixing a metal oxide precursor salt with a refractory metal oxide support precursor salt, converting the salt or salts to the respective metal oxides and subjecting the resultant combination to steaming at elevated temperatures prior to use. Catalysts prepared in this matter exhibit enhanced activity and selectivity as compared to conventional acid catalysts. They also exhibit remarkable resistance to coke make.

The inorganic refractory metal oxide supports which are not themselves acid cracking catalysts are selected from the group consisting of alumina, zirconia, boria, thoria, magnesia, zirconium-titania, chromia, silica and kieselguhr and mixtures thereof, preferably alumina, while it is preferred that the catalytic metal oxide be selected from the group consisting of tungsten and niobium, most preferably tungsten. The amount of catalytic metal oxide ranges from 0.5 to 25 wt.%, preferably 2–10 wt.%, most preferably 5–6 wt. % based on total catalyst. This steaming step is conducted at a temperature of from 600° to 1200° C. in an atmosphere comprising from 0.1 to 100% water as steam, the balance being inert, nonreactive components such as argon, nitrogen, helium, $O_2$, air, etc.

PRIOR ART AND BACKGROUND

Cracking of petroleum fractions over acid catalysts represent the most widely used means of molecular weight reduction in refining processes. In a cracking process, in the presence of steam, a potentially effective catalyst in the process is required to have components which retain a high level of acid cracking activity in the presence of steam.

Most of the conventional acid catalysts used in catalytic cracking processes are known to be unsuited for use in the presence of steam at temperatures greater than about 1400° F. (760° C.). The effects of water are considered to be those of a structural poison and result in a weakening of the acid strength of the acid sites. Stability in high steam environments is desirable however, since one way of removing the coke which is inevitably deposited on the catalyst is to steam gasify the coke on the catalyst. The burning off of the coke necessarily requires the presence of steam.

In cracking processes it is generally the object to generate lower molecular weight, but commercially valuable products, from higher molecular weight crude feedstocks. The catalysts used in these acid catalyzed processes, however normally suffer from extreme sensitivity to contaminants in the feedstocks such as sulfur, nitrogen and traces of various metals such as nickel, vanadium, iron, chromium. The catalysts are also susceptible to rapid deactivation by the depositing of coke.

U.S. Pat. No. 3,649,707 teaches a multistep, multicatalyst dealkylation using steam. The first reaction zone utilizes a catalyst composite containing as active ingredients a cobalt component, a nickel component or a Group VIB component, preferably composited with a high surface area refractory inorganic oxide type carrier characterized in having a surface area of at least 50 $m^2/gm$. These carriers include alumina, silica, silica-alumina, zirconia, thoria, magnesia, titania, bauxite, mordenite, faujasite, etc. The cobalt, nickel or Group VIB component can be in the elemental or preferably the oxide form. This catalyst is used in a first reaction zone for dealkylating an alkyl aromatic at dealkylation conditions controlled to produce a first reaction zone effluent wherein about 1 to about 20 wt.% preferably about 1 to 10 wt.% of the alkylaromatic passed to said zone is dealkylated. Zone one is run at conditions which include a temperature of about 300° C. to about 700° C., a pressure of about atmospheric to about 100 atmospheres, a steam to hydrocarbon mole ratio of about 1:1 to about 30:1 or more and a liquid hourly hydrocarbon space velocity of about 0.1 to about 20 $hr^{-1}$ or more. The reaction practiced in this zone is dealkylation as has been previously stated. Steam dealkylation is a catalyzed reaction wherein water is a consumed reactant. This is to be contrasted with acid cat cracking which is associated with acid sites found on the catalyst and which though preferably practiced in the presence of steam does not consume the steam that is, water is not a reactant.

U.S. Pat. No. 2,849,383 teaches catalysts for use in hydrocarbon conversion processes and the processes themselves, wherein the catalyst consists essentially of a siliceous cracking catalyst such as silica-alumina and an oxide of a metal from Group VB or VIB, V, Nb, Ta, Cr, Mo, W. The siliceous cracking catalyst is described as a synthetic or natural siliceous composition which contains at least 50% silica (calculated as $SiO_2$). The siliceous material can be silica-alumina, silica-magnesia, silica-zirconia and silica-alumina-zirconia. The metal oxide (from Groups VB or VIB) must be incorporated with the cracking catalyst in a quantity of at least 2.9% by weight. The material can be deposited on the carrier or coprecipitated with the siliceous carrier. It is further stated that an essential step in the preparation of the catalyst composition is the steaming of the composition after calcination for from 1 to 8 hours at temperatures of from 600° C. to 800° C. in 100% steam. While this reference recites the above process in general, there are examples in the specification only of chromia on silica-alumina. The fact that this steaming is effective only for certain combinations of materials when the support is alumina was not recognized by the art.

THE INSTANT INVENTION

In hydrocarbon conversion processes wherein petroleum fractions are cracked over acid catalysts, it has been discovered that remarkable improvements in the realms of selectivity and % conversion are obtained by running such conversion processes (e.g. gas oil catalytic cracking, heavy ends cat cracking, etc.) in the process of catalysts comprising a catalytic metal oxide component, wherein said catalytic metal oxide is selected from the group consisting of the oxides of tungsten, niobium, and mixtures thereof, and tungsten or niobium oxides in combination with one or more additional metal oxides selected from the group consisting of tantalum oxide, hafnium oxide, chromium oxide, titanium oxide and zirconium oxide, preferably the oxides of tungsten, niobium and mixtures thereof, most preferably, the oxide of tungsten or niobium, supported on certain refractory metal oxide supports which are not themselves acid cracking catalyst under normally employed conditions, preferably, alumina, zirconia, boria, thoria, magnesia, zirconium titanate, titania, chromia, silica, kieselguhr and mixtures thereof, preferably the aluminas, i.e., $\eta$-alumina, $\gamma$-alumina, $\alpha$-alumina. These catalysts are prepared by techniques known in the art, e.g. incipient wetness impregnation techniques, etc. Metal oxide precursors, for example, ammonium meta-tungstate, are deposited on the selected refractory oxide support followed by conversion into the oxide form and calcination. Before use the metal oxide/support combination can be subjected to steaming. For certain transition metal oxide concentrations the steaming treatment significantly improves the catalytic cracking activity. These catalysts demonstrate resistance to deactivation and maintain high conversion and selectivity activities. They also resist poisoning by sulfur and nitrogen and are relatively uneffected by techniques utilized to remove coke deposits.

The catalysts of the instant invention are prepared by impregnating the desired high surface area refractory oxide with a solution of a precursor of the desired metal oxide. The solution used in impregnating the refractory oxide support may be aqueous or organic, the only requirement being that an adequate amount of precursor compound for the selected metal oxide is soluble in the solvent used in preparing the impregnating solution. Aqueous or alcohol solutions preferably aqueous or ethanol solutions are normally used for convenience. The following is a non-exhaustive exemplary recitation of metal salts which may be used in preparing the desired compositions.

Salts of the transition metals which were employed in the catalyst preparations were those which were soluble in, without reaction with, either aqueous or nonaqueous solutions. for the aqueous preparation salts such as ammonium para-molybdate, ammonium meta-tungstate, chromium trioxide, and ammonium meta-vanadate and perrennic acid were employed. For the nonaqueous preparation salts such as $TiCl_4$, $ZrCl_4$, $HfCl_4$, $CrO_2Cl_2$, $WCl_6$, $Nb_2(OC_2H_5)_{10}$, $Ta_2(OC_2H_5)_{10}$, $W(CO)_6$. Additional salts which can be used are the soluble bromides, iodides and oxychlorides. Also organo-metallic metal catalyst precursor salts such as the cyclic polyolefin carbonyl complexes, or the like, may be employed, i.e., $C_8H_8M(CO)_3$, M=Cr, W. Also arene-metal complexes such as $(C_6H_6)_2Cr$ may be employed. Pseudohalide salts such as $Cr(CNC_6H_5)_5$ may also be used. Acetates and acetylacetonate metal salts can also be employed. Soluble sulfide complexes such as $C_4H_{10}S_2W$ $(CO)_4$ can also be employed. Amine-substituted complexes such as $(pyridine)_3$-$W$ $(CO)_3$ can be employed.

The refractory oxide support should have a high surface area in the region of about 10 to 500 $m^2/g$, preferably 20 to 200 $m^2/g$, most preferably over 100 $m^2/g$ prior to the deposition of the metal oxide salt precursor. These surface areas are as measured by the Brunauer-Emmett-Teller (BET) method.

The catalyst may also be prepared by conventional coprecipitation techniques, in which case, the metal salt or salts are comingled in solution with a soluble salt precursor of the support. Simultaneous precipitation may be induced by pH changes, the catalyst filtered, dried and calcined in air to convert the metal precursor salt and support precursor salts into oxides.

When using the impregnation technique the impregnating solution is contacted with the refractory oxide support for a time sufficient to deposit the precursor material onto the carrier either by selective adsorption or alternatively, the excess solvent may be evaporated during drying leaving behind the precursor salt. Advantageously, the incipient wetness techniques may be used whereby just enough of a precursor salt solution is added to dampen and fill the pores of the high surface area powder of the above-recited refractory oxide support material.

The composite thus prepared by any of the above-recited techniques, or any other known in the art is dried at a temperature of from 50° to 300° C. to remove the excess solvent and then converted into the oxide form by exposure at temperatures of from 150° to 800° C., preferably 300°-700° C. in an atmosphere such as $O_2$, Air, He, Ar, Ne and combinations thereof. Reducing atmospheres may also be used but require subsequent calcination to convert the reduction metal component to the oxide form. This exposure is for a time sufficient to convert essentially all of the metal salt precursor into metal oxide. The calcination is useful to decompose the metal salt precursor to the oxide form. Calcination, however, may not be required for certain metal precursor salts which readily convert into metal oxides.

These metal oxide/carrier composites can optionally be subjected to high temperature steaming prior to use for periods of from 0.1 to 60 hours, preferably 1 to 16 hours, at temperatures ranging from 600° to 1200° C., preferably 800° C.–1200° C. and preferably in from 0.1 to 100% steam, the balance of the atmosphere being inert gases ($O_2$, Air, Ar, Ne, He, $N_2$ and mixtures thereof).

These catalysts have been found to be effective in hydrocarbon conversion processes, such as gas oil cat cracking, resid cat cracking, heavy ends cat cracking, acid hydrocracking, etc. wherein the hydrocarbonaceous feed to be converted is contacted with the catalysts under conditions sufficient to effect the desired conversion in the presence of water. Typical hydrocarbonaceous feedstreams which are catalytically converted comprise mixed hydrocarbons boiling within the range of from 400° to 1200° C.

By way of example, two typical gas oils used as feeds for cat cracking are:

TABLE I

| ERDL CAT CRACKING PILOT PLANT FEEDS INSPECTIONS | | |
|---|---|---|
| | ETLGO | CM |
| Feed Symbol | | |
| Gravity, °API | 33.3 | 28.4 |
| Aniline Point, °F. | 192 | 171 |

TABLE I-continued

ERDL CAT CRACKING PILOT PLANT FEEDS INSPECTIONS

|  | ETLGO | CM |
|---|---|---|
| Br.No., g Br/100 gr | * | 6.5 |
| Ref. Index, $N_D$ @ 67° C. | 1.477 | 1.4735 |
| Pour Point, °F. | * | 65 |
| Sulfur, Wt. % | 0.20 | 0.78 |
| Nitrogen, wppm | * | 447 |
| ASTM D-1160 Distillation |  |  |
| 5% @ °F. | 546 | 502 |
| 10% @ °F. | 552 | 538 |
| 50% @ °F. | 592 | 693 |
| 90% @ °F. | 653 | 888 |
| 95% @ °F. | 664 | 928 |
| FBP | 678 | 978 |

*Not available

Typical catalytic conversion process parameters include temperatures ranging from 300° to 900° C., preferably 400° to 600° C., pressures ranging from 0 to 10,000 psig, preferably 50–500 psig. Contact time can range from less than 1 sec to as high as 2000 secs, preferably 1 sec to 120 secs, at from 0.1 to 50 Weight Feed/Hr/Weight Catalyst (WHW), preferably 1–4 WHW. Optionally, $H_2O$ as steam may be added along with the hydrocarbon feedstream. When this is done, the $H_2O$/hydrocarbon mole ratio ranges from 0.5:1 to 20:1, preferably 1:1 to 10:1.

The catalysts employed have metal oxide loadings of from 0.5 to 25 wt.% metal oxide based on total catalyst composition, preferably 2–10 wt.%, more preferably 4–6 wt.% metal oxide based on total catalyst composition.

When using the mixed oxide systems of tungsten oxide or niobium oxide in combination with one or more of tantalum oxide, chromium oxide, titanium oxide, zirconium oxide and hafnium oxide (which additional oxides are used to supply support surface area maintenance as discussed in greater detail below) the ratio of tungsten or niobium oxide to the additional metal oxide is in the order of 1:1, preferably 3:1, most preferably 9:1.

The catalysts described as useful in the above-recited processes may also advantageously contain traces of various promoter materials selected from the group consisting of barium oxides, calcium oxides, magnesium oxides. These materials in the form of precursor salts can be incorporated into the carrier simultaneously with the metal precursor salt or sequentially (the order of addition being merely a matter of choice) or may be coprecipitated with the metal precursor salts and carrier precursor salts. Alternatively, they may be added subsequent to the formation of the catalyst composite.

If used at all these promoters are present at from 0.01 to 4.0 wt.% promoter based on total catalyst composition wherein the amount of promoter metal oxide ranges from 0.1% to 40%, preferably, 0.1% to 5% of the catalytic metal oxide content.

ALUMINA SURFACE AREA MAINTENANCE

Numerous transition metal oxides appear to stabilize substantially the surface area and hence the acidity of the $MO_x$—$Al_2O_3$ (M=Group IVb, Vb, VIb transition metal) system by stabilizing the surface area of the alumina. The transition metal oxides which exert the strongest surface area maintenance effect on alumina are the oxides of chromium, titanium, zirconium, niobium, hafnium and tantalum, preferably $Cr_2O_3$, $TiO_2$, $ZrO_2$, $Nb_2O_5$, $HfO_2$ and $Ta_2O_5$. The amount of such oxides present may range from 1–8 wt.% metal oxide based on total catalyst composition, preferably 2–6 wt.% the BET surface areas being on the order of 110 to 135 $m^2$/g. Following steaming at 900° C. in air for 16 hours, the BET surface area of 3.6 wt.% $TiO_2$ on $Al_2O_3$ was 117 $m^2$/g; of 5.6 wt. % $ZrO_2$ on $Al_2O_3$ was 133 $m^2$/g; of $Nb_2O_5$ on $Al_2O_3$ was 110 $m^2$/g; of $Ta_2O_5$ on $Al_2O_3$ was 130 $m^2$/g. The $Al_2O_3$ used had an original BET surface area of 190 $m^2$/g.

The presence of selected Group IVb, Vb and VIb metal oxides on the support also dramatically reduces the amount of coke which deposits on the system. This reduced coke make coupled with support surface area maintenance results in a catalyst possessing superior activity and conversion characteristics.

EXPERIMENTAL

The process unit used for conducting the following experiments is a typical downflow gas phase reactor (40 cc capacity) capable of operation at temperatures as high as 550° C. and pressures as high as 500 psig. Liquid oil feed to the unit is by a dual-barrel Ruska pump. Water is fed to the reactor by a Lapp pump. Gas feeds are controlled by Research Control valves coupled to a Foxboro Flow Controller. The reactor is heated by a fluidized sandbath. Typical operating conditions have been 510° C. (950° F.) and 30 psig. Liquid weight hourly space velocities have been varied from about 1.4 $hr^{-1}$ to 5.6 $hr^{-1}$ for both oil and water. The oil feed used is an East Texas Light Gas Oil (ETLGO) with the properties given in Tables I and II.

The principal objective of the initial experiments has been the determination of the stability of the $WO_3$ system compared to standard systems (zeolites and silica-aluminas) after steaming at 1600° F. (870° C.) for 16 hours. The catalyst steamings were carried out in an upflow 3-zone furnace operated at ambient pressure with a gas feed consisting of 90% steam and 10% inert gas. The water was fed to the system by a Milton-Roy mini-pump at the rate of about 35 cc liq. per hour. The temperature in the central zone was held at about 870° C. (1600° F.).

The $WO_3$/$Al_2O_3$ catalysts used in this study were prepared by incipient wetness techniques using aqueous solutions of ammonium meta-tungstate. The alumina used was reforming grade $\gamma$-$Al_2O_3$ (BET surface area ~180 $m^2$/g) extrudate form. The silica-alumina catalysts were either obtained from Division Chemical Division; or a silica-alumina catalyst obtained from Exxon Research Development Labs either calcined at 1000° F. or steamed at 1400° F. for 16 hrs. The zeolite catalysts studied were either calcined at 1000° F. or steamed at 1400° F. for 16 hrs. The silica-aluminas and zeolites were mixed with about 25% Degussa Alumina (BET surface area 100 $m^2$/g) as a binder and pilled prior to activity measurements.

TABLE II

G.C. DISTILLATION OF ETLGO FEED

| Pct. Off | °F. | °C. |
|---|---|---|
| 0 | 421 | 216 |
| 1 | 442 | 228 |
| 5 | 491 | 255 |
| 10 | 520 | 271 |
| 25 | 559 | 293 |
| 50 | 605 | 318 |
| 75 | 656 | 347 |
| 90 | 695 | 368 |
| 95 | 713 | 378 |

TABLE II-continued

| G.C. DISTILLATION OF ETLGO FEED | | |
|---|---|---|
| Pct. Off | °F. | °C. |
| 99 | 761 | 405 |
| 100 | 850 | 454 |

FIG. 1 shows the effect of steaming on the activity of a 10% $WO_3/Al_2O_3$ catalyst compared to a conventional silica-alumina catalyst and to the pure alumina substrate. The activity is defined as the amount of 430− liquid material produced per hour per gram of total catalyst. Note that this represents the activity of the various catalysts to produce a gasoline-type liquid. It is seen from FIG. 1 that the $WO_3$ catalyst is markedly different from the conventional silica-alumina catalyst with regard to its stability towards severe steaming. The silica-alumina catalyst loses a substantial fraction of its activity whereas the $WO_3/Al_2O_3$ catalyst loses almost none of its activity. The alumina base used in the preparation of the $WO_3$ catalyst has a low fresh (unsteamed) activity and loses virtually all its activity after steaming.

Figure 2:
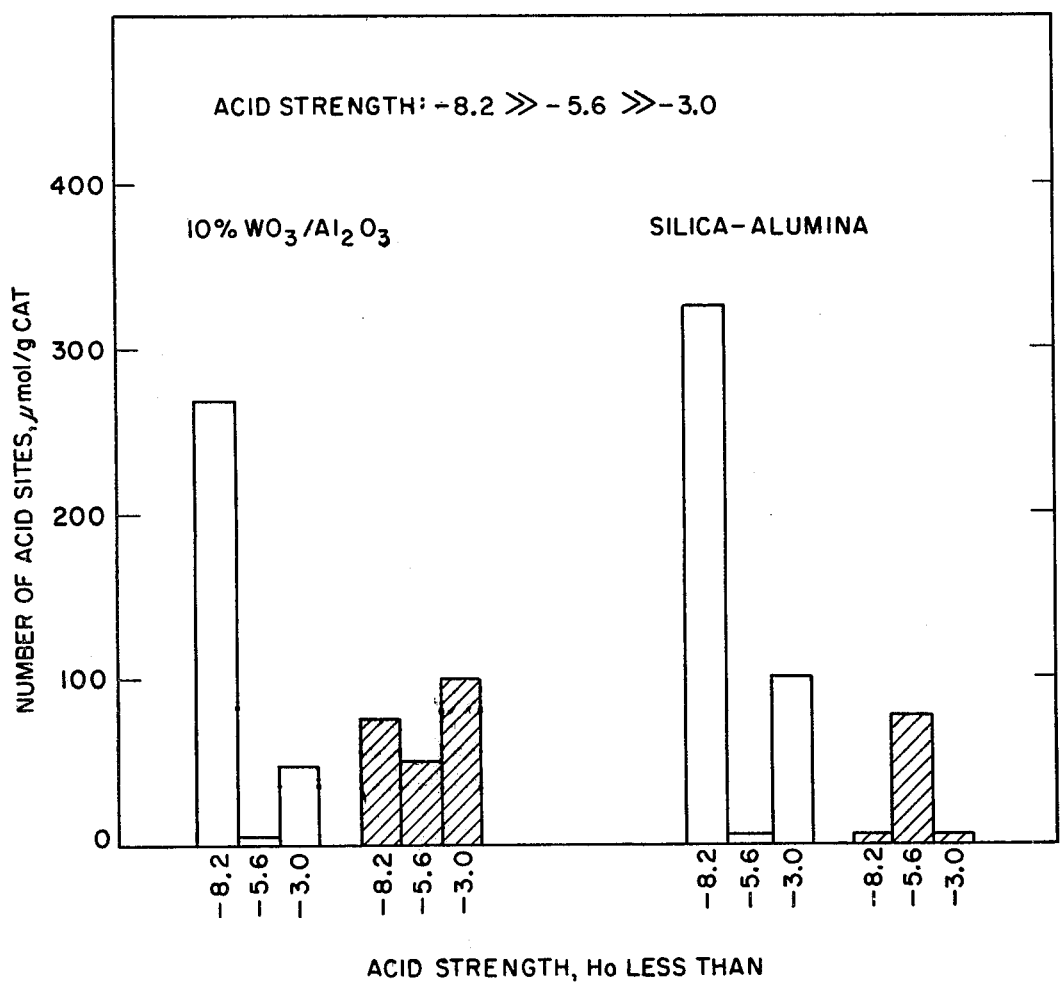

FIG. 2 depicts the effect of steaming on the acid site strength and distribution for the $WO_3/Al_2O_3$ and $SiO_2$-$Al_2O_3$ cats. Again it is seen that there is substantial difference between the $WO_3/Al_2O_3$ catalyst and the silica-alumina catalyst. For the $WO_3/Al_2O_3$ catalyst there are still a significant number of very strong (−8.2 on a Hammett Acidity Scale) sites which are the sites believed to be primarily responsible for cat-cracking reactions. On the other hand, the silica-alumina catalyst loses all of its strong acid (−8.2) sites. It is clear that steaming has caused a major change in the surface morphology of the silica-alumina catalyst resulting in the complete destruction of surface sites having strong acid character. The $WO_3/Al_2O_3$ catalyst is apparently not similarly affected thereby indicating a substantial difference in the nature of the strong acid sites on the two catalysts. During steaming the surface area of the $WO_3$-/$Al_2O_3$ catalyst drops from about 180 $m^2/g$ to about 60–70 $m^2/g$. The silica-alumina catalyst drops in surface area from 350 $m^2/g$ to about 40 $m^2/g$. The activity maintenance and the constancy of the number and strength of acid sites on the $WO_3/Al_2O_3$ system indicate that the $WO_3$ or $WO_3$-$Al_2O_3$ sites remain unchanged after steaming in spite of the large loss in surface area of the catalyst. The collapse of surface area for silica-alumina apparently results in a complete alteration of the catalyst surface and catalytic activity.

Figure 3:
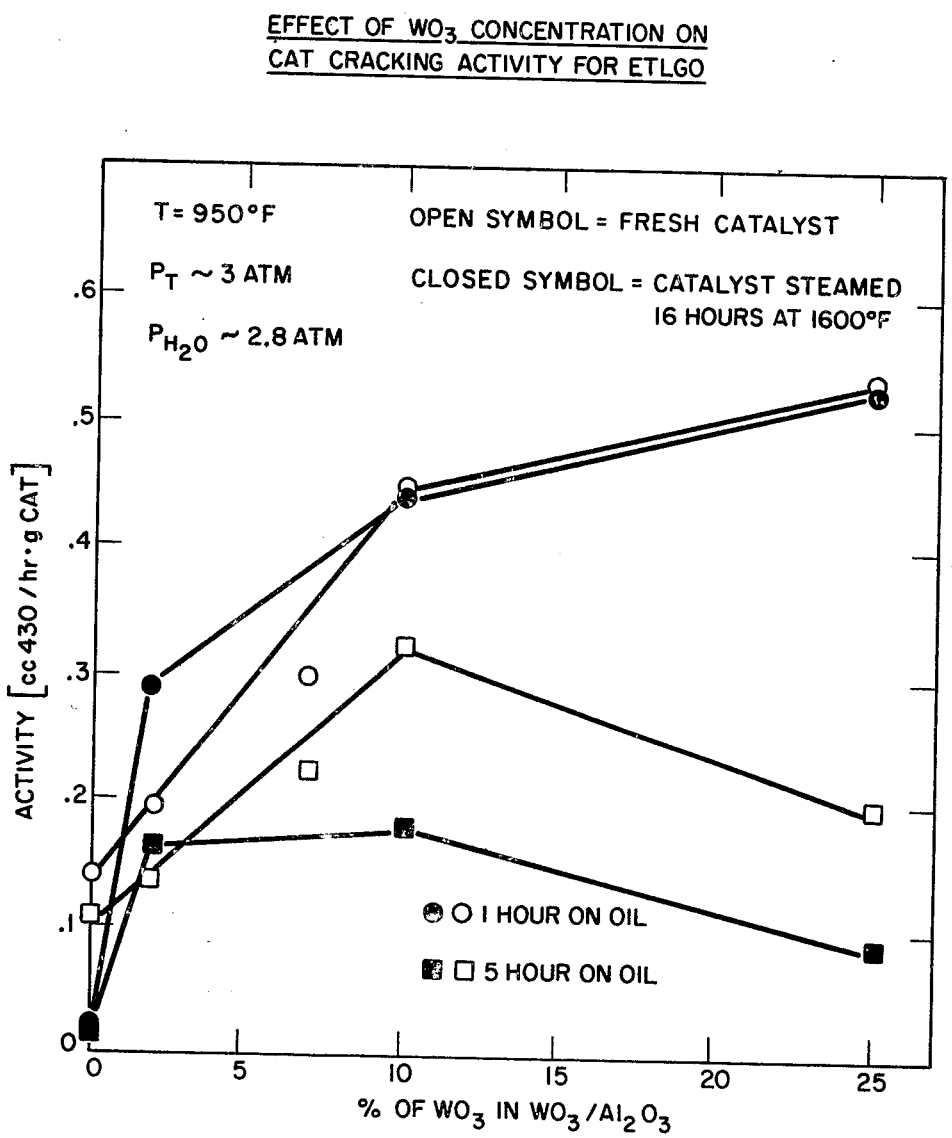

FIG. 3 shows the effect of $WO_3$ concentration on the activity at 1 hour and 5 hours on oil for the $WO_3/Al_2O_3$ catalyst system before and after steaming at 1600° F. for 16 hours. It is clear that increasing $WO_3$ concentration increases conversion at one hour on oil for the fresh catalysts. The difference in activity for fresh catalysts at one hour on oil compared to five hours on oil increases with increasing $WO_3$ concentration, eventually becoming quite large for the 25% $WO_3/Al_2O_3$ catalyst. After steaming similar effects occur but important differences emerge. At the 2% $WO_3$ level steaming actually increases activity. At the 10% and 25% loading levels steaming does not substantially alter activity. At all $WO_3$ loading levels the drop in activity from one hour to five hours increases from the values observed before steaming. The nature of these changes all indicate that during steaming $WO_3$ is probably being concentrated onto the alumina surface as the alumina substrate collapses in surface area. The activity maintenance nevertheless indicates that the $WO_3$ remains completely accessible for catalysts. ESCA results indicate an increase in W/Al ratio after steaming. This is further evidence that the $WO_3$ concentrates to the surface. This result is reasonable in view of the fact that $WO_3$ is a much more volatile oxide than is the $Al_2O_3$ substrate. It should be added that under identical reaction conditions to those used in the above discussed experiments a zeolite catalyst steamed at somewhat less severe conditions than either the $WO_3/Al_2O_3$ or silica-alumina catalysts also lost substantial activity after steaming. The activity at one hour on oil as defined in FIG. 1 dropped from 0.74 to 0.24. This again illustrates the inherent steam stability of the $WO_3/Al_2O_3$ system relative to conventional catalyst systems.

The reaction investigated was gas oil cracking to break C-C bonds in the presence of a large excess of steam. The cracking reaction produces a liquid gasoline fraction referred to as the $C_5$-430− fraction or cut. The amount of this gasoline fraction is referred in the below tables as the conversion. The conversion was measured after a 0.5 and a 1 hr. interval. The competing side reactions which are undesirable are gasification and coking. Both side reactions are important in catalytic-cracking because they directly affect the gasoline yields. All the catalysts in the tables below were evaluated at a relatively high space velocity in order to minimize catalyst deactivation by coking. All reactions were for a 12.5 g catalyst charge with an oil flow rate of 80 cc/hr.

In the following examples a series of the Group IV, V, VIB metal oxides and rhenium oxide supported on alumina are compared for catalytic activity. The activity measurements were obtained in a typical downflow gas phase reactor having a total catalyst capacity of 40 cc. Liquid oil is fed to the reactor by a dual barrel Ruska pump. Water is fed simultaneously to the oil by a Lapp pump. The reactor is maintained at reaction temperature by immersion in a heated fluidized sandbath. Operating conditions are as follows: Oil Feed: East Texas Light Gas Oil, Boiling Range 450°–700° F.

Catalyst Temp: 510° C. Pressure: 30 PSIG°. (WHSV)+ Oil: 5.6.

$H_2O$:Oil Molar Ratio: 10

+Weight hourly space velocity

Activities are expressed as the amount of oil feed converted to liquid product boiling below 430° F., i.e. this is referred to as 430− °F. product. The activity is thus defined by the following expression:

Activity=Conversion to 430− °F. Liquid×Flow Rate of Oil×(Cat Weight)$^{-1}$

Prior to activity measurement, the catalyst was brought to reaction temperature and water added for ½ hour prior to addition of oil feed. This is necessary to prevent premature coking of the catalyst surface.

The thermal stability of the catalyst described in the current invention were determined by subjecting the various catalysts to a high temperature calcination in moist air. The conditions used to determine stability were air calcination at 900° C. with air sparged through a water saturator. The steaming treatment was carried out at ambient pressure.

EXAMPLE 1

An alumina of high purity (reforming grade, Engelhard Industries) was evaluated for acid cat cracking activity under the conditions described previously after a one-half hour period and a one hour period on oil. The Al$_2$O$_3$ catalyst had an activity of 0.005 and 0.01 cc, 430−°F. liquid produced/hour/g catalyst, respectively. The total gas production after one hour was 0.4 liter. The coke on catalyst was 1.6 and 0.7 wt. % for the top and the bottom of the catalyst bed, respectively. This example is for comparison to other catalysts of the instant invention. See Table III A.

EXAMPLE 2

A 3.6 wt. % TiO$_2$ on Al$_2$O$_3$ catalyst (containing 450 μm/g of Ti) was prepared using a methanol solution of TiCl$_4$ sufficient to fill the pore volume of the alumina described in Example 1. Following drying of the catalyst under vacuum to remove methanol the catalyst was dried at 110° C. overnight. The catalyst was then calcined at 500° C. overnight in a muffle furnace. The cat cracking activity was obtained as described previously. The 3.6% TiO$_2$ on Al$_2$O$_3$ catalyst had an activity of 0.04 and 0.03 cc 430−°F. liquid produced/hour/g catalyst following a one-half hour and a one hour period on oil, respectively. The total gas produced after one hour was 0.6 l. The coke on catalyst was 0.9 and 0.3 wt. % for the top and the bottom of the catalyst bed, respectively.

This example serves to demonstrate the minor improvement in the cat cracking activity realized for a TiO$_2$ on Al$_2$O$_3$ catalyst compared to Al$_2$O$_3$ of Example 1. See Table III A.

EXAMPLE 3

A 5.6 wt. % ZrO$_2$ on Al$_2$O$_3$ catalyst (containing 450 μm/g of Zr) was prepared using a methanol solution of ZrCl$_4$ sufficient to fill the pore volume of the alumina described in Example 1. The catalyst was then treated as described in Example 2. The cat cracking activity was obtained as described previously. The 5.6% ZrO$_2$ on Al$_2$O$_3$ catalyst had an activity of 0.03 cc 430−°F. liquid product/hour/g catalyst for both a one-half hour period and a one hour period on oil. The total gas production after one hour was 0.5 l. The coke on catalyst was 0.9 and 0.3 wt. % for the top and bottom of the catalyst bed, respectively.

This example again serves to demonstrate the minor improvement in the cat cracking activity realized for this catalyst compared to Al$_2$O$_3$ of Example 1 and very similar activity to the TiO$_2$ on Al$_2$O$_3$ catalyst of Example 2. See Table III B.

EXAMPLE 4

A 9.5 wt. % HfO$_2$ on Al$_2$O$_3$ catalyst (containing 450 μm/g of Hf) was prepared using a methanol solution of HfCl$_4$ sufficient to fill the pore volume of the alumina described in Example 1. The catalyst was then treated as described in Example 2. The cat cracking activity was obtained as described previously. The 9.5% Hf on Al$_2$O$_3$ catalyst had an activity of 0.01 and 0.02 cc 430−°F. liquid product/hour/g catalyst following a one-half hour and a one hour period on oil, respectively. The total gas produced after one hour was 0.2 l. The coke on catalyst was 0.8 and 0.5 wt. % for the top and the bottom of the catalyst bed, respectively.

This example again serves to demonstrate the minor improvement in the cat cracking activity realized for this catalyst compared to Al$_2$O$_3$. See Table III C.

EXAMPLE 5

A 4.0 wt. % V$_2$O$_5$ on Al$_2$O$_3$ catalyst (containing 450 μm/g of V) was prepared using a methanol solution of VOCl$_3$ sufficient to fill the pore volume of the alumina described in Example 1. The catalyst was then treated as described in Example 2. The cat cracking activity was obtained as described previously. The 4.0% V$_2$O$_5$ on Al$_2$O$_3$ catalyst had an activity of 0.23 and 0.12 cc 430−° F. liquid product/hour/g catalyst for both a one-half hour and a one hour period on oil. The total gas produced after one hour was 0.7 l. The coke on the catalyst was 2.1 and 1.6 wt. % for the top and bottom of the catalyst bed, respectively.

This example serves to demonstrate the major improvement in the cat cracking activity realized for this catalyst compared to the previous catalysts, Examples 1, 2, 3 and 4. This example also demonstrates that the activity realized is not associated with large coke deposits on the catalyst, e.g. 2.1 for this example compared to 1.6 of Example 1, respectively. Also, this example further demonstrates that the high activity of the catalyst of this example is realized with very similar gas production compared to the relatively inactive catalysts of the previous Examples 1, 2, 3 and 4. See Table III A.

EXAMPLE 6

A 6.0 wt. % Nb$_2$O$_5$ on Al$_2$O$_3$ catalyst (containing 450 μm/g of Nb) was prepared using a hexane solution of Nb(OC$_2$H$_5$)$_5$ sufficient to fill the pore volume of the alumina described in Example 1. The catalyst was then treated as described in Example 2. The cat cracking activity was obtained as described previously. The 6.0% Nb$_2$O$_5$ on Al$_2$O$_3$ catalyst had an activity of 0.59 and 0.45 cc 430−° F. liquid product/hour/g catalyst for both a one-half hour and a one hour period on oil, respectively. The total gas produced after one hour was 0.8 l. The coke on the catalyst was 1.5 wt. % for both the top and the bottom of the catalyst bed.

This example serves to demonstrate the major improvement in the cat cracking activity realized for this catalyst compared to the catalysts of Example 1, 2, 3 and 4. This example does indicate that the high activity obtained for this catalyst is about 2.5 times the activity obtained for V$_2$O$_5$ on Al$_2$O$_3$, Example 5. This example also demonstrates that the activity realized is not associated with large coke deposits on the catalyst, e.g. 1.5 compared to 1.6 for this example compared to Example 1, respectively. Also, this example further demonstrates that the high activity of the catalyst of this example is realized with very similar gas production compared to the relatively inactive catalysts of the previous Examples 1, 2, 3 and 4. See Table III B.

EXAMPLE 7

Another portion of the catalyst described in Example 6 was charged to a quartz tube, 1″ in diameter, and placed in a tube furnace. The catalyst was steamed at 900° C. (1660° F.) with 20% O$_2$ in He sparged through water for 16 hours. The cat cracking activity was obtained as described previously. The steam treated 6% Nb$_2$O$_5$ on Al$_2$O$_3$ catalyst had an activity of 0.47 and 0.24 cc 430−°F. liquid product/hour/g catalyst for a one-half hour and a one hour period on oil, respectively. The total gas produced after one hour was 1.0 l. The coke on the catalyst was 2.5 and 2.3 wt. % for the top and the bottom of the catalyst bed, respectively.

This example serves to demonstrate the major improvement in the cat cracking activity realized for this catalyst compared to the previous catalysts, Examples 1, 2, 3 and 4. This example also demonstrates that the activity realized is not associated with large coke deposits on the catalyst, e.g. 2.5 for this example compared to 1.6 for Example 1, respectively. Most importantly this example demonstrates that high cat cracking activity is maintained even after severe steam treatment of the catalyst. Also, this example further demonstrates that the high activity of the catalyst of this example is realized with very similar gas production compared to the relatively inactive catalysts of the previous Examples 1, 2, 3 and 4. This example serves to demonstrate one of the most important results for the transition metal oxide acid catalysts of the instant invention, i.e. high temperature steam stability. See Table III B.

EXAMPLE 8

A 10.0 wt. % $Ta_2O_5$ on $Al_2O_3$ catalyst (containing 450 μm/g of Ta) was prepared using a heptane solution of $Ta(OC_2H_5)_5$ sufficient to fill the pore volume of the alumina described in Example 1. The catalyst was then treated as described in Example 2. The cat cracking activity was obtained as described previously. The 10.0% $Ta_2O_5$ on $Al_2O_3$ catalyst had an activity of 0.10 and 0.06 cc 430$-°$ F. liquid product/hour/g catalyst for a one-half hour and a one hour period on oil, respectively. The total gas produced after one hour was 0.4 l. The coke on the catalyst was 1.0 and 1.1 wt. % for the top and the bottom of the catalyst bed, respectively.

This example serves to demonstrate that the cat cracking activity of a transition metal oxide supported on alumina is quite dependent on the transition metal ion chosen. Both $V_2O_5$ and $Nb_2O_5$, Examples 5 and 6, respectively are more active than the $Ta_2O_5$ catalyst of this example despite the fact that the transition metal concentration of all three catalysts was identical, i.e. 450 μm/g catalyst. This example, however, does serve to demonstrate higher cat cracking activity of the catalyst of this example compared to the previous catalysts of Examples 1, 2, 3 and 4. The Group VB metal oxides supported on alumina all exhibit greater cat cracking activity than the analogous Group IVB metal oxides supported on alumina. The most active Group VB oxide being niobium oxide, Example 6. See Table III C.

EXAMPLE 9

Because of the good cat cracking maintenance of the $Nb_2O_5$ on $Al_2O_3$ catalyst following severe steaming conditions, Example 7, another portion of the $Ta_2O_5$ alumina catalyst was treated under the conditions described in Example 7. The steam-treated 10% $Ta_2O_5$ on $Al_2O_3$ catalyst had an activity of 0.04 and 0.005 cc 430$-°$ F. liquid product/hour/g catalyst for a one-half hour and a one hour period on oil, respectively. The total gas produced after one hour was 1.7 . 1 The coke on the catalyst was 6.1 and 8.4 wt. % for the top and the bottom of the catalyst bed, respectively.

This example demonstrates that a $Ta_2O_5$ on $Al_2O_3$ catalyst is not able to maintain cut cracking activity for high temperature steaming conditions unlike that observed for a $Nb_2O_5$ on $Al_2O_3$ catalyst, Example 7. This example also demonstrates a major problem with coke production for this steamed catalyst compared to the catalyst of Example 7. See Table III C.

EXAMPLE 10

Because of the wide usage of $Cr_2O_3$ on $Al_2O_3$ catalysts in heterogeneous catalysis, two different preparations were investigated. Both an aqueous and a nonaqueous preparation was made for comparison. A 4.5 wt. % $Cr_2O_3$ on $Al_2O_3$ catalyst (containing 450 μm/g of Cr) was prepared using an aqueous solution of chromic acid sufficient to fill the pore volume of the alumina described in Example 1. This catalyst will be referred to as Catalyst A. Another 4.5 wt. % $Cr_2O_3$ on $Al_2O_3$ catalyst was prepared using a methanol solution of $CrO_2Cl_2$ sufficient to fill the pore volume of the alumina described in Example 1. This catalyst will be referred to as Catalyst B. Catalysts A and B were both treated as described in Example 2. The cat cracking activity was obtained as described previously. Catalyst A has an activity of 0.06 and 0.03 cc 430$-°$ F. liquid product/hour/g catalyst for a one-half hour and a one hour period on oil, respectively. The total gas produced after one hour was 0.7 . 1 The coke on the catalyst was 3.4 and 1.9 wt. % for the top and the bottom of the catalyst bed, respectively.

Catalyst B had an activity of 0.01 and 0.05 cc 430$-°$ F. liquid product/hour/g catalyst for a one-half hour and a one hour period on oil, respectively. The total gas produced after one hour was 0.7 . 1 The coke on the catalyst was 2.0 and 1.7 for the top and the bottom of the catalyst bed, respectively.

This example serves to demonstrate the rather low cat cracking activity for both catalyst A and B of this example. The superior activity of Catalyst A results in a higher coke make than for Catalyst B. This example further serves to demonstrate that the cat cracking activity of a transition metal oxide supported on alumina is quite dependent on the transition metal ion chosen. See Table III A.

EXAMPLE 11

A 6.9% $MoO_3$ on $Al_2O_3$ catalyst (containing 450 μm/g Ta) was prepared using an aqueous solution of ammonium molybdate sufficient to fill the pore volume of the alumina described in Example 1. The catalyst was then treated as described in Example 2. The cat cracking activity was obtained as described previously. The 6.9% $MoO_3$ on $Al_2O_3$ catalyst had an activity of 0.26 and 0.04 cc 430$-°$ F. liquid product/hour/g catalyst for a one-half hour and a one hour period on oil, respectively. The total gas produced after one hour was 4.2 . 1 The coke on catalyst was 15.5 and 12.9 wt. % for the top and the bottom of the catalyst bed, respectively.

This example has many important points to be made in comparison to the results of the other examples of the instant invention. Firstly, it should especially be noted that the gas make and coke deposits of this catalyst are much higher than for any of the catalysts of the previous examples. Secondly, note the marked decrease in the catalytic activity for the one hour compared to the one-half hour run length. This decrease in activity results in an activity only 14% of that for the shorter sample period. In contrast, the $Nb_2O_5$ on $Al_2O_3$ catalyst of Example 6 maintained 76% of activity of the shorter sample period. Clearly, the $MoO_3$ on $Al_2O_3$ catalyst would result in a cat cracking catalyst with very poor characteristics: high gas production, large coke production and rapid catalyst deactivation. This example further serves to demonstrate that the cat cracking activity of a transition metal oxide supported on alumina is quite dependent on the transition metal chosen. Note, also, the quite different results of the MoO$_3$ on Al$_2$O$_3$ catalyst compared to Cr$_2$O$_3$ catalysts of Example 10. See Table III B.

EXAMPLE 12

A 10% WO$_3$ on Al$_2$O$_3$ catalyst (containing 430 μm/g of W) was prepared using an aqueous solution of ammonium tungstate sufficient to fill the pore volume of the alumina described in Example 1. The catalyst was then treated as described in Example 2. The cat cracking activity was obtained as described previously. The 10% WO$_3$ on Al$_2$O$_3$ catalyst had an activity of 0.79 and 0.68 cc 430$-°$ F. liquid product/hour/g catalyst for a one-half hour and a one hour period on oil, respectively. The total gas produced after one hour was 2.2 . 1 The coke on catalyst was 4.3 and 6.0 wt. % for the top and the bottom of the catalyst bed, respectively.

This example has many important points to be made in comparison to the results of the other examples of the instant invention. Firstly, it should especially be noted that this is the most active catalyst of all those in the previous examples but with relatively low gas production, e.g. 2.2 for WO$_3$ on Al$_2$O$_3$ compared to 4.2 for MoO$_3$ on Al$_2$O$_3$, Example 11. Secondly, the catalytic activity remains quite high for the one hour reaction period despite the relative high coke production on the catalyst. This is evidence for WO$_3$ on Al$_2$O$_3$ tolerating high coke deposits while maintaining high catalytic activity. High coke tolerance for an acid catalyst would be a much desired feature for a heavy resid cat cracking process. See Table III C.

EXAMPLE 13

Another portion of the catalyst of Example 12 was steam treated at 900° C. as described in Example 7. The cat cracking activity was obtained as described previously. The steam-treated 10% WO$_3$ on Al$_2$O$_3$ catalyst had an activity of 0.68 and 0.58 cc 430$-°$ F. liquid product/hour/g catalyst for a one-half hour and a one hour period on oil, respectively. The total gas produced was 2.3 . 1 The coke on the catalyst was 6.0 and 4.1 wt. % for the top and the bottom of the catalyst bed, respectively.

This example serves to demonstrate that the WO$_3$ on Al$_2$O$_3$ catalyst steamed at 900° C. is not greatly decreased in activity compared to the unsteamed catalyst of Example 12. This example collaborates the results obtained for the Nb$_2$O$_5$ on Al$_2$O$_3$ catalyst of Example 7. This example constitutes one of the most important results for the transition metal oxide acid catalysts of the instant invention, i.e. high temperature steam stability. See Table III C.

EXAMPLE 14

A 10.9 wt. % Re$_2$O$_7$ on Al$_2$O$_3$ catalyst (containing 450 μm/g of Re) was prepared using an aqueous solution of perrhenic acid sufficient to fill the volume of the alumina described in Example 1. The catalyst was then treated as described in Example 2. The cat cracking activity was obtained as described previously. The 10.9% Re$_2$O$_7$ on Al$_2$O$_3$ catalyst had an activity of 0.06 and 0.04 cc 430$-°$ F. liquid product/hour/g catalyst for a one-half hour and a one hour period on oil, respectively. The total gas produced after one hour was 6.8 . l The coke on catalyst was 23.4 and 21.9 for the top and the bottom of the catalyst bed, respectively.

This example has many important points to be made in comparison to the results of the other examples of the instant invention. Firstly, this example emphasizes the completely different cat cracking results in changing in the third row of the periodic table from W to Re. The gas make and coke on catalyst of the Re$_2$O$_7$ on Al$_2$O$_3$ catalyst would make the catalyst completely unsuitable as a catalyst because the valuable liquid product would be converted to a large degree to gases and coke. Secondly, the cracking activity of this catalyst is quite low in comparison to the WO$_3$ on Al$_2$O$_3$ catalyst of Example 12. This example further serves to demonstrate that the cat cracking activity of a transition metal oxide supported on alumina is quite dependent on the transition metal chosen. See Table III C.

TABLE III A

| | FIRST ROW ELEMENTS OF GROUP IV, V, VIB | | | |
|---|---|---|---|---|
| Catalyst | Conversion at 0.5 hr | Conversion at 1 hr. | Gas Make (1) | % C on Cat Top/Bottom |
| 3.6% TiO$_2$ on Al$_2$O$_3$ | 0.9 | 0.7 | 0.6 | 1/1.4 |
| 4% V$_2$O$_5$ on Al$_2$O$_3$ | 4.9 | 2.7 | 0.7 | 2.1/1.6 |
| 4.5% Cr$_2$O$_3$ on Al$_2$O$_3$ (Aq.Prep) | 1.2 | 0.6 | 0.7 | 3.4/1.9 |
| 4.5% Cr$_2$O$_3$ on Al$_2$O$_3$ (Non-Aq. Prep.) | 0.2 | 1.1 | 0.7 | 2.0/1.7 |
| Al$_2$O$_3$ Blank | 0.1 | 0.2 | 0.4 | 1.6/0.7 |

It is clear from the data in the above Table that vanadium oxide is the only first row transition metal oxide with appreciable activity. This activity is still a factor of three lower than for 10% WO$_3$ on Al$_2$O$_3$, however.

TABLE III B

| | SECOND ROW ELEMENTS OF GROUP IV, V and VIB | | | |
|---|---|---|---|---|
| Catalyst | Conversion at 0.5 Hr. | Conversion at 1 Hr. | Gas Make (1) | % C on Cat Top/Bottom |
| 5.6% ZrO$_2$ on Al$_2$O$_3$ | 0.7 | 0.7 | 0.5 | .9/.3 |
| 6% Nb$_2$O$_5$ on Al$_2$O$_3$ | 12.9 | 9.8 | 0.8 | 1.5/1.5 |
| 6% Nb$_2$O$_5$ on Al$_2$O$_3$ (Steamed at 900° C.) | 10.3 | 5.2 | 1.0 | 2.5/2.3 |
| 6.9% MoO$_3$ on Al$_2$O$_3$ | 5.7 | 0.8 | 4.2 | 15.5/12.9 |
| Al$_2$O$_3$ Blank | 0.1 | 0.2 | 0.4 | 1.6/0.7 |

The data in the above table is very significant. The cracking activity of Nb$_2$O$_5$ on Al$_2$O$_3$ is very high, only ca. 25% less than 10% WO$_3$ on Al$_2$O$_3$. However, the gas make and coke on catalyst are both less than WO$_3$ on Al$_2$O$_3$. Also, the above Nb$_2$O$_5$ on Al$_2$O$_3$ catalyst shows good steam stability as found for WO$_3$ on Al$_2$O$_3$. This is a very promising catalyst discovery. Note also the much greater activity of Nb$_2$O$_5$ catalyst compared to the other second row elements. Particularly, note the huge coke production of the MoO$_3$ catalyst.

TABLE III C

| | THIRD ROW ELEMENTS OF GROUP IV, V, VI, VIIB | | | |
|---|---|---|---|---|
| Catalyst | Conversion at 0.5 Hr. | Conversion at 1 Hr. | Gas Make (1) | % C on Cat Top/Bottom |
| 9.5% HfO$_2$ on Al$_2$O$_3$ | 0.3 | 0.4 | 0.2 | 0.8/0.5 |
| 10% Ta$_2$O$_5$ on Al$_2$O$_3$ | 2.1 | 1.4 | 0.4 | 1/1.1 |
| 10% Ta$_2$O$_5$ on Al$_2$O$_3$ (Steamed) | 0.9 | 0.1 | 1.7 | 6.1/8.4 |
| 10% WO$_3$ on Al$_2$O$_3$ | 17.1 | 14.9 | 2.2 | 4.3/6.0 |
| 10% WO$_3$ on Al$_2$O$_3$ (Steamed) | 14.8 | 12.5 | 2.3 | 6.0/4.1 |
| 10% WO$_3$ on SiO$_2$ (P.P.G. Beads, Non-Aq. Prep.) | 1.3 | 0 | 0.5 | |
| 10% WO$_3$ on SiO$_2$ Al$_2$O$_3$ | 15.4 | 10.3 | 2.2 | |
| 10.9% Re$_2$O$_7$ on | 1.2 | 0.8 | 6.8 | 23.4/21.9 |

TABLE III C-continued

| THIRD ROW ELEMENTS OF GROUP IV, V, VI, VIIB | | | | |
|---|---|---|---|---|
| Catalyst | Conversion at 0.5 Hr. | Conversion at 1 Hr. | Gas Make (1) | % C on Cat Top/ Bottom |
| Al$_2$O$_3$ | | | | |
| Al$_2$O$_3$ Blank | 0.1 | 0.2 | 0.4 | 1.6/0.7 |

The above data demonstrates that the WO$_3$ on Al$_2$O$_3$ catalyst is far superior to any of the third row metals of Group IV, V, VI and VIIB. Also, the WO$_3$ on Al$_2$O$_3$ catalyst is steam stable as evidenced by the steamed catalyst having 85% of the fresh catalyst activity.

EXAMPLE 15

An alumina ($\gamma$-Al$_2$O$_3$) extrudate available commercially (Engelhard Industries) was evaluated for cat cracking activity under conditions described above. At these conditions after 1 hour on oil, the Al$_2$O$_3$ catalyst had an activity of 0.01 cc 430—° F. liquid produced/hour/g cat. The total gas production after 1 hour was 0.4 liter. This example is for comparison to other catalysts of the instant invention.

EXAMPLE 16

A 2% WO$_3$ on Al$_2$O$_3$ catalyst was prepared by standard impregnation techniques using an aqueous solution of ammonium metatungstate (AMT) onto the alumina extrudate described in Example 15. Following drying at 110° C. overnight this catalyst was calcined at 500° C. for 16 hours and then evaluated for cat cracking activity under identical conditions to those described previously. At these conditions the activity for 430—° F. liquid production is 0.40 cc 430—° F. liquid produced/hr/g cat. The gas production after 1 hour was 0.5 liter. This example is for comparison to other catalysts of the current invention. This example also illustrates the much higher activity for cat cracking of 2% WO$_3$ on Al$_2$O$_3$ catalyst compound to the pure Al$_2$O$_3$ support described in Example 15.

EXAMPLE 17

A portion of the 2% WO$_3$ on Al$_2$O$_3$ catalyst described in Example 16 was steam treated at 900° C. for 16 hours in air sparged through water. After steaming, a portion of the catalyst was evaluated for activity for cat cracking of gas oil under conditions identical to those described previously. At these conditions the activity for 430—° F. liquid production is 0.22 cc 430—° F./hr/g cat. The gas production after 1 hour was 0.5 liter. This example serves to demonstrate the superior catalytic activity of this high temperature steamed catalyst compared to alumina itself, Example 15. This catalyst also demonstrates that about one-half the catalytic activity has been maintained following the above high temperature steam treatment compared to the unsteamed catalyst of Example 16. This example is also of value when compared to other tungsten oxide catalysts of the instant invention.

EXAMPLE 18

A 4% WO$_3$ on Al$_2$O$_3$ catalyst was prepared by standard impregnation techniques using an aqueous solution of ammonium metatungstate onto the alumina extrudate described in Example 15. This catalyst was calcined in air at 500° C. for 16 hours and then evaluated for cat cracking activity under conditions identical to those described previously. At these conditions the activity for 430—° F. liquid production is 0.40 cc 430—° F. liq/hr/g cat. The total gas make after 1 hour is 0.7 liter. This example is useful for comparison to the steamed catalyst of Example 19. The catalytic activity of this example is quite close to the activity obtained for the catalyst of Example 16 despite the factor of two differences in the tungsten oxide content of this catalyst.

EXAMPLE 19

A portion of 4% WO$_3$ on Al$_2$O$_3$ catalyst described in Example 18 was subjected to a steaming treatment for 16 hours at a temperature of 900° C. After this treatment the cat cracking activity for 430—° F. liquid production was 0.53 cc 430—° F. liq/hr/g cat. The total gas production after 1 hour was 0.9 liter.

This example demonstrates a unique feature of the WO$_3$ on Al$_2$O$_3$ catalysts of the instant invention. The catalytic activity of this high temperature steamed catalyst is increased over the unsteamed catalyst, Example 18. In addition, the activity of this steamed 4% WO$_3$ on Al$_2$O$_3$ catalyst is much greater than the activity of the steamed 2% WO$_3$ on Al$_2$O$_3$ catalyst of Example 17. This example thereby demonstrates the critical dependence of tungsten oxide content on catalytic activity following severe steaming conditions.

EXAMPLE 20

A 6% WO$_3$ on Al$_2$O$_3$ catalyst was prepared by impregnation of an aqueous solution of ammonium metatungstate onto the alumina extrudate described in Example 15. This catalyst was then calcined in air for 16 hours at 500° C. and then evaluated for cat cracking activity under conditions previously described. At these conditions, the activity for 430—° F. liquid production is 0.69 cc 430— liq/hr/g cat. The total gas make after 1 hour is 1.8 liter. This example demonstrates the superior activity of a 6% WO$_3$ on Al$_2$O$_3$ to either the 4% WO$_3$ on Al$_2$O$_3$ catalyst, Example 18, or the 2% WO$_3$ on Al$_2$O$_3$ catalyst, Example 16. This example further demonstrates the critical dependence on tungsten oxide content of catalytic activity. This example is useful for comparison to Example 21.

EXAMPLE 21

A portion of the 6% WO$_3$ on Al$_2$O$_3$ catalyst described in Example 20 was subjected to a steaming treatment for 16 hours at 900° C. After this treatment the cat cracking activity for 430—° F. liquid production was 1.00 cc 430—° F. liq/hr/g cat. The total gas make after 1 hour on stream was 1.8 liter. This example illustrates the superior activity of the steamed 6% WO$_3$ on Al$_2$O$_3$ catalyst compared to the unsteamed 6% WO$_3$ on Al$_2$O$_3$ catalyst described in Example 20. This example demonstrates a unique feature of WO$_3$ on Al$_2$O$_3$ catalysts of the instant invention. The catalytic activity of this high temperature steamed catalyst is increased over that of the unsteamed catalyst of Example 20. In addition, the activity of the steamed catalyst is higher than the steamed and unsteamed 4% WO$_3$/Al$_2$O$_3$ catalysts of Examples 18 and 19 and also higher than the activities of the steamed and unsteamed 2% WO$_3$/Al$_2$O$_3$ catalysts of Examples 16 and 17. This demonstrates the critical dependence of WO$_3$ content on catalytic activity following severe steaming treatment.

EXAMPLE 22

An 8% $WO_3/Al_2O_3$ catalyst was prepared by impregnating an aqueous solution of ammonium metatungstate onto the alumina extrudate described in Example 15. This catalyst was calcined for 16 hours at 500° C. and then evaluated for cat cracking activity under conditions identical to those described previously. At these conditions, the activity for 430—° F. liquid production is 0.73 cc 430—° F. liq/hr/g cat. The total gas make after 1 hour is 2.0 liter. This example is useful for comparison to the steamed catalyst of Example 23.

EXAMPLE 23

A portion of the 8% $WO_3$ on $Al_2O_3$ catalyst described in Example 22 was subjected to a steaming treatment for 16 hours at 900° C. After this treatment, the cat cracking activity for 430—° F. liquid production was 0.81 cc 430—° F./hr/g cat. The total gas make after 1 hour on stream was 2.0 liter. This example demonstrates a unique feature of the $WO_3/Al_2O_3$ catalysts of the current invention. The catalytic activity of this high temperature steamed catalyst is increased over the unsteamed catalyst, Example 22. In addition the activity of this steamed catalyst is more active than the steamed 2% $WO_3$ on $Al_2O_3$ and 4% $WO_3$ on $Al_2O_3$ catalysts of Examples 17 and 19, respectively. However, the activity of this steamed catalyst is lower in activity compared to the steamed 6% $WO_3$ on $Al_2O_3$ catalyst of Example 21. This example further demonstrates the critical dependance of tungsten oxide content on catalytic activity following severe steaming treatments.

EXAMPLE 24

A 10% $WO_3/Al_2O_3$ catalyst was prepared by impregnating an aqueous solution of ammonium metatungstate onto the alumina extrudate described in Example 15. This catalyst was calcined in air at 500° C. for 16 hours and then evaluated for cat cracking activity under conditions identical to those described previously. At these conditions the activity for 430—° F. liquid production of 0.95 cc 430—° F./hr/g cat. The total gas make after 1 hour on stream is 2.2 liter. This example is useful for comparison to Example 25. This example also demonstrates a higher activity compred to other unsteamed $WO_3/Al_2O_3$ catalysts of lower $WO_3$ concentrations.

EXAMPLE 25

A portion of the 10% $WO_3/Al_2O_3$ catalyst described in Example 24 was subjected to a steaming treatment at 900° C. for 16 hours. After this treatment, the cat cracking activity for 430—° F. liquid production was 0.80 cc 430—° F./hr/g cat. The total gas make after 1 hour on stream was 2.3 liter. This example demonstrates the unique feature of good high temperature stability of $WO_3/Al_2O_3$ catalysts of the instant invention.

EXAMPLE 26

A 25% $WO_3$ on $Al_2O_3$ catalyst was prepared by impregnating an aqueous solution of ammonium metatungstate onto an alumina extrudate identical to and described in Example 15. This catalyst was calcined in air at 500° C. for 16 hours and then evaluated for cat cracking activity under conditions identical to those described previously. At these conditions the activity for 430—° F. liquid production is 0.49 cc liq/hr/g cat. The total gas make after 1 hour on stream is 4.6 liter. This example is useful for comparison to catalysts of the instant invention. This example demonstrates little advantage of increased $WO_3$ content much above the 10% $WO_3$ content described in Example 24.

EXAMPLE 27

An amorphous silica-alumina catalyst (13% $Al_2O_3$) that had been air calcined at 540° C. for 16 hours was evaluated for cat cracking activity under conditions identical to those described above. Under these conditions, the activity for 430—° F. liquid production was 0.83 cc 430—° F. liq/hr/g cat. The total gas make after 1 hour on stream was 2.8 liter. This example is useful for comparison to catalysts of the current invention. Fresh $SiO_2.Al_2O_3$ has activity comparable to 8% $WO_3$ on $Al_2O_3$ (Example 22) and 10% $WO_3$ on $Al_2O_3$ (Example 24). This example is also useful for comparison to Examples 28 and 29.

EXAMPLE 28

A portion of the $SiO_2.Al_2O_3$ catalyst described in Example 27 was steamed for 16 hours at 760° C. The activity of this catalyst was 0.72 cc 430—° F. liq/hr/g cat. The total gas make after 1 hour was 0.7 liter. This example is useful for comparison to Examples 32 and 33 and to catalysts of the current invention. A steaming treatment at 760° C. has only a modest effect on activity compared to the activity of a fresh $SiO_2Al_2O_3$ catalyst (Example 27). This catalyst is comparable in activity to $WO_3$ on $Al_2O_3$ catalysts, both fresh and steamed, described in Examples 20 to 25.

EXAMPLE 29

A portion of the $SiO_2.Al_2O_3$ catalyst described in Example 27 was steam treated for 16 hours at 900° C. The activity of this catalyst was 0.32 cc 430—° F. liq/hr/g cat. The total gas make after 1 hour on stream was 0.8 liter. This example is useful for comparison to Example 27 and 28 and to catalysts of the instant invention. The $SiO_2.Al_2O_3$ catalyst steamed at 900° C. has lost substantial activity compared to fresh $SiO_2.Al_2O_3$ catalysts (Example 27) and to $SiO_2.Al_2O_3$ catalyst steamed at lower temperature (Example 28). This example also serves to show that commercially available $SiO_2.Al_2O_3$ cat cracking catalysts have substantially lower thermal stability in the presence of steam compared to catalysts of the current invention (see examples 19 to 25).

EXAMPLE 30

A commercial zeolite cracking catalyst consisting of 8.5% zeolite in an amorphous $SiO_2.Al_2O_3$ matrix was calcined at 540° C. for 16 hours under conditions identical to those described above. The catalyst had an activity for 430— liquid production of 1.35 cc 430—/hr/g cat. Total gas make after 1 hour was 3.3 liter. This example is useful for comparison to Examples 31 and 32 and to catalysts of the current invention. This example demonstrates that a typical fresh zeolite cat cracking catalyst has activity somewhat higher than catalysts of the current invention. For example, the activity of this catalyst is 1.42 times more active than the 10% $WO_3$ on $Al_2O_3$ catalyst described in Example 24.

EXAMPLE 31

A portion of the catalyst described in Example 30 was steam treated at 760° C. for 16 hours. This catalyst had an activity of 1.42 cc 430—° F./hr/g cat. The total gas make after 1 hour on stream was 2.9 liter. This example is useful for comparison to Examples 30 and 32 and to catalysts of the current invention. A steaming treatment at 760° C. has a slight beneficial effect on the activity of this catalyst compared to a fresh calcined catalyst described in Example 30. The activity of this catalyst is somewhat higher than catalysts of the current invention.

EXAMPLE 32

A portion of the catalyst described in Example 30 was steam treated at 900° C. for 16 hours. This catalyst had an activity of 0.10 cc 430—° F./hr/g cat. Total gas make after 1 hour on stream was 0.9 liter. This example is useful for comparison to Examples 30 and 31 and to catalysts of the current invention. The activity of the zeolite cracking catalyst following a severe steaming treatment at 900° C. declines more than on order of magnitude compared to the activity of a fresh zeolite catalyst (Example 30) or a zeolite catalyst steamed at lower temperatures (Example 31). This example also serves to show the much superior thermal stability of the catalyst of the current invention compared to a state of the art commercial cat cracking catalyst. See for example the effect of steaming on the activity of catalysts in Examples 19 to 25.

STEAM STABILITY OF $WO_3$ ON $Al_2O_3$ VS ZEOLITE OR $SiO_2.Al_2O_3$

In the previous discussion on the Group IV, V, VI and VIIB metal oxides as cracking catalysts the conditions employed to test the catalysts were reported. Therefore, they will not be repeated here. Below is the data obtained by comparing the $WO_3$ on $Al_2O_3$ catalyst to $SiO_2.Al_2O_3$ as well as a commercial zeolite cat cracking catalyst. Each catalyst was investigated fresh, steamed at 1400° F. and also at 1600° F. The steam stability at 1600° F. is a crucial requirement for steam gasification of the carbon deposits on the catalyst which might be a requirement for a resid cat cracking process.

TABLE IV

| Catalyst | Conversion at 0.5 Hr. | Conversion at 1 Hr. | Gas Make (1) | % C on Cat Top/Bottom |
|---|---|---|---|---|
| 10% $WO_3$ on $Al_2O_3$ (Fresh) | 22.5 | 13.5 | 2.1 | 5.2/5.2 |
| 10% $WO_3$ on $Al_2O_3$ (Repeat Preparation Fresh) | 17.1 | 14.9 | 2.2 | 4.3/6.0 |
| 10% $WO_3$ on $Al_2O_3$ (Steamed 900° C.) | 14.8 | 12.5 | 2.3 | 6.0/4.1 |
| Zeolite Catalyst Fresh | 20.7 | 21.1 | 3.3 | 3.4/4.2 |
| Zeolite Catalyst (Steamed 760° C.–1400° F.) | 38.8 | 22.2 | 2.9 | 2.1/3.4 |
| Zeolite Catalyst (Steamed 900° C.–1660° F.) | 4.0 | 1.6 | 0.9 | 1.5/1.4 |
| Silica-Alumina (14% $Al_2O_3$) Fresh | 11.8 | 12.9 | 2.8 | 4.3/5.2 |
| Silica-Alumina (Steamed 760° C.–1400° F.) | 19.2 | 11.3 | 0.7 | 2.5/2.1 |
| Silica-Alumina (Steamed 900° C.–1660° F.) | 5.8 | 5.0 | 0.8 | 2.1/1.8 |

The zeolite and silica-alumina catalysts steamed at 1650° F. are much less active than the steam stable $WO_3$ on $Al_2O_3$ catalyst. Also, the activity of the fresh $WO_3$ on $Al_2O_3$ catalyst compares favorably after a one-hour run period with either fresh zeolite or fresh silica-alumina catalyst.

It has also been demonstrated that a marked difference in catalyst activity between the $WO_3$ on $Al_2O_3$ catalyst calcined in steam at 900° C. and the same weight loading of tungsten oxide impregnated onto pre-steamed alumina. Consider the table below. All catalysts were at the 4 wt.% $WO_3$ level.

TABLE V

| Catalyst | Conversion at 0.5 Hr. | Conversion at 1 Hr. | Gas Make (1) | % C on Cat Top/Bottom |
|---|---|---|---|---|
| 4% $WO_3$ (Fresh) | 8.9 | 6.2 | 0.7 | 0.9/1.0 |
| Above Cat Steamed at 900° C. | 11.3 | 8.3 | 0.9 | 2.4/2.2 |
| Steamed $Al_2O_3$ followed by identical prep. as for 4% $WO_3$ catalyst above (Fresh) | 9.7 | 2.8 | 0.6 | 2.0/2.7 |

Note the large drop in catalyst activity following one hour reaction period.

EXAMPLE 33

The preparation of high surface area $\alpha$-$Al_2O_3$ from $\gamma$-$Al_2O_3$ (190 m²/g) in extrudate form where a carbon char was formed in the pores of the extrudate was achieved by the following procedure. A standard sugar solution was prepared by dissolving 250 g of sucrose in 100 milliliters of distilled water heated to 140° F. A 50 milliliter portion of this saturated solution was contacted with 100 g of $\gamma$-alumina extrudates of reforming grade purity (Engelhard Industries, Inc.) This amount of the sugar solution was just that amount which would fill the pore volume of the extrudates. Therefore, this procedure constitutes a quasi-incipient wetness impregnation. The entire amount of material was then dried at 120° C. for 16 hrs. Following this overnight drying step the weight of the extrudates plus the weight of sugar in the pores was 135 g. Therefore, a 35% weight increase occurred due to the sugar impregnation step. The above preparation was then divided into two equal portions. Each portion was then treated in a tube furnace for 16 hrs. under a blanket of flowing helium to "char" the sugar in the pores of the alumina extrudate. Large quantities of water were removed in this heat treatment step. The weight percent carbon found on a sample from each bath treated at 600° C. was in good agreement, 7.0 and 7.2 wt.% carbon. These two batches were then combined and used in a series of experiments reported in other Examples.

EXAMPLE 34

A few gram portion of the carbonized-alumina of Example 33 was heated in a tube furnace at 1100° C. in a reducing atmosphere of 15% $H_2$ in Argon to insure that the carbon would not be removed by oxidation. The objective of this heat treatment was to convert the $\gamma$-alumina phase to an $\alpha$-alumina phase while maintaining high surface area. The sample was kept at this temperature for 16 hrs. The sampe was then removed from the tube furnace at ambient temperature. To remove the carbon from the pores of the alumina the sample was treated in a tube furnace at 680° C. in flowing 20% oxygen in helium at a flow rate of 500 cc/minute for 16 hrs. The X-ray diffraction pattern for a powder sample indicated a mixture of alumina phases to be present for the 1100° C. heat treatment. Both γ- and α-Al$_2$O$_3$ phases were present. This example serves to demonstrate that partial conversion of the γ-alumina occurs at 1100° C. for a portion of the sample of Example 33 with 7% carbon in the pores of the extrudate. The surface area of this extrudate was 80.3 m$^2$/g.

EXAMPLE 35

A few grams of the carbonized-alumina of Example 33 was treated as described in Example 34 except that the high temperature treatment was increased to 1150° C. Treatment at 1150° C. resulted in complete conversion of the γ-alumina phase to α-alumina based on the X-ray diffraction pattern of this sample. The surface area of this sample was 37.6 m$^2$/g. This example serves to demonstrate the sensitivity of the γ-alumina to α-alumina phase transformation as a function of temperature. The weight % carbon on this α-Al$_2$O$_3$ sample was only 0.06 wt. % following the calcination step. This low carbon level indicates that a carbon-free α-phase has been produced by the procedure described in Example 34.

EXAMPLE 36

A few grams of the carbonized-alumina of Example 33 was treated as described in Example 34 except that the high temperature heat treatment was increased to 1200° C. The X-ray diffraction pattern of this sample was quite similar to that of Example 35. This indicates, of course, that the 1150° C. treatment temperature was very near to the lower temperature limit which converts the alumina described in Example 1 to the α-phase. The surface area of the α-Al$_2$O$_3$ produced by the above 1200° C. calcination treatment was 21.3 m$^2$/g. This Example serves to demonstrate the advantages of a minimum temperature of heat treatment in maintaining a high surface area for the α-alumina phase produced. The α-alumina produced in Example 35 at 1150° C. has a surface area nearly double that of the material of this Example. This Example points to a very important function of temperature in controlling the final α-alumina surface area. It is most important in many catalytic processes known to those skilled in the art to maintain the maximum surface area of the catalyst in as high as state as possible. This Example clearly shows the unexpected importance of small temperature differences in producing a material of maximum surface area.

EXAMPLE 37

Instead of using a few grams of the carbonized-alumina, 70 g of the material was heat treated at 1150° C. as in Example 35. However, instead of a calcination treatment at 700° C. to remove the carbon a calcination step at 892° C. for 16 hrs. in 20% O$_2$ in helium at 500 cc/min was used. As noted in Example 35, X-ray analysis of this sample showed complete conversion of γ-alumina to α-alumina. Also, the surface area of this sample was found to be 43.2 m$^2$/g. This example serves to demonstrate two important points. Firstly, a high surface area α-alumina in extrudate form can be prepared in a completely reproducible fashion as described in Example 35 by a 1150° C. heat treatment. Secondly, the α-alumina produced in this example is stable to a 892° C. calcination treatment. Note that the calcination treatment is 200° C. higher than for the sample of Example 35 while having a slightly higher surface area. This remarkable stability of the α-alumina phase to desurfacing under extreme temperature conditions is an unexpected finding not recognized in the prior art. Also, it is quite significant that the surface area of this sample is over twice that of the 1200° C. prepared sample of Example 36.

EXAMPLE 38

To 55 g of the α-alumina in extrudate form of Example 37, 3.16 g of ammonium meta-tungstate containing 2.89 g WO$_3$ in 27.5 cc of water was added. This amount of liquid is just that which fill the pores of the extrudate. The sample was then dried for 16 hours at 120° C. and finally calcined overnight at 500° C. in a muffle furnace. The final catalyst contained 5 wt. % WO$_3$ on the α-Al$_2$O$_3$ extrudate. An X-ray analysis of a powdered sample indicated the WO$_3$ phase to be in less than 4.0 nm diameter particles as no lines due to a WO$_3$ phase were observed. In order to determine if the WO$_3$ on α-Al$_2$O$_3$ phase was acidic, a standard Benesi titration with n-butylamine was used. (K. Tanabe, "Solid Acids and Bases", Academic Press, N.Y. 1970, p. 14). The α-alumina itself, Example 37, was shown to have no strong acid sites (−8.2 and −5.6 on the Ho Hammett activity scale). However, for the 5% WO$_3$ α-alumina there were 37±12 μm/g of −8.2 strength acid centers. This example serves to demonostrate that introduction of WO$_3$ onto α-alumina produces a solid acid with strong acid sites. This material of this Example was investigated for gas oil catalytic cracking and was shown to have significant catalytic activity (Example 39).

EXAMPLE 39

The catalyst of Example 38 was investigated for gas oil cracking activity as described in previous examples. The catalytic activity following a one-half hour period was 0.19 cc 430$^{-°}$ F. liquid produced/hour/g catalyst. The total gas production after one hour was 0.6 l. The coke on catalyst was 1.3 and 1.3 wt.% for the top and the bottom of the catalyst bed, respectively. This example serves to demonostrate that WO$_3$ on α-Al$_2$O$_3$ is an active cat cracking catalyst. The activity of WO$_3$ on α-Al$_2$O$_3$ compared to γ-Al$_2$O$_3$ of Example 1 was a factor of 38 higher. The α-Al$_2$O$_3$ of Example 37 itself would be less active than γ-Al$_2$O$_3$ as α-Al$_2$O$_3$ was shown to have no strong acid sites (see discussion Example 38).

EXAMPLE 40

To 29.34 g of the α-alumina in extrudate form of Example 6, 0.657 g of ammonium meta-tungstate was added as described in Example 38. The above sample was dried and calcined as described in Example 38. The final catalyst contained 2 wt.% WO$_3$ on α-Al$_2$O$_3$. Fifteen grams of the above sample was calcined for 16 hrs. at 900° C. in air sparged through water. The surface area of this sample following this severe steaming treatment was found to be 33.7 m$^2$/g. This example serves to demonostrate the good surface area stability of WO$_3$-supported on the α-alumina of the present invention. Note that the surface area of the α-alumina of Example 37, 43.2 m$^2$/g is largely preserved for a sample containing WO$_3$ and following a severe steaming treatment.

What is claimed is:

1. In an acid catalyst preparation method wherein a catalytic component is deposited upon an inorganic refractory metal oxide support which is not itself an acid cracking catalyst so as to result in a supported catalyst which is pretreated prior to use in acid catalyzed hydrocarbon conversion processes, the improvements comprising:
  (a) using as the catalytic component a metal oxide selected from the group consisting of the oxides of niobium, tungsten, and mixtures thereof, and tungsten or niobium oxides in combination with one or more additional metal oxides selected from the group consisting of tantalum oxide, hafnium oxide, chromium oxide, titanium oxide and zirconium oxide, and
  (b) subjecting the supported catalyst prior to use to a steam atmosphere at a temperature of from 600° to 1200° C.

2. The catalyst preparation method of claim 1 wherein the steam atmosphere comprises from 0.1 to 100% steam, the balance being inert gas.

3. The catalyst preparation method of claim 1 wherein the catalytic metal oxide component is selected from the group consisting of tungsten oxide and niobium oxide.

4. The catalyst preparation method of claim 1 wherein the inorganic refractory metal oxide support which is not an acid cracking catalyst is alumina, zirconia, boria, thoria, magnesia, zirconium-titanate, titania, chromia, silica, kieselguhr and mixtures thereof.

5. The catalyst preparation method of claim 4 wherein the catalytic metal oxide component is selected from the group consisting of tungsten oxide and niobium oxide.

6. The catalyst preparation method of claim 1 wherein the refractory metal oxide support is alumina.

7. The catalyst preparation method of claim 6 wherein the catalytic metal oxide component is selected from the group consisting of tungsten oxide and niobium oxide.

8. The catalyst preparation method of claim 6 wherein the catalytic metal oxide component is tungsten oxide.

9. The catalyst preparation method of claim 1 wherein step (b) is conducted outside the catalytic process reactor.

10. The catalyst preparation method of claim 1 wherein step (b) is conducted in situ in the catalytic process reactor.

11. The catalyst preparation method of claim 9 wherein the catalytic metal oxide component is selected from the group consisting of tungsten oxide and niobium oxide and the refractory inorganic oxide support is alumina.

12. An acid catalyst comprising a catalytic metal oxide component selected from the group consisting of oxides of tungsten, niobium and mixtures thereof, and tungsten or niobium oxides in combination with one or more additional metal oxides selected from the group consisting of tantalum oxide, hafnium oxide, chromium oxide, titanium oxide and zirconium oxide supported on an inorganic refractory metal oxide base which is not itself an acid cracking catalyst prepared by the process of contacting a catalytic metal oxide precursor salt with an inorganic refractory metal oxide base or metal oxide base precursor salt, converting the salt or salts to catalytic metal oxide and refractory metal oxide base respectively and steaming the resulting composite at a temperature of from 600° to 1200° C., the steaming being conducted in a steam atmosphere comprising from 0.1 to 100% steam, the balance being inert gas.

13. The catalyst prepared as in claim 12 wherein the catalytic metal oxide is selected from the group consisting of the oxides of tungsten and niobium.

14. The catalyst prepared as in claim 12 wherein the inorganic refractory metal oxide base which is not itself an acid cracking catalyst is selected from the group consisting of alumina, titania, zirconia, boria, thoria, magnesia, zirconium-titanate, chromia, silica, kieselguhr and mixtures thereof.

15. The catalyst prepared as in claim 12 wherein the catalytic metal oxide is tungsten and the inorganic non-acidic refractory metal oxide is alumina.

16. The catalyst prepared as in claim 12 wherein the catalytic metal oxide comprises from 0.5 to 25 wt.% of the total catalyst.

17. The catalyst prepared as in claim 16 wherein the catalytic metal oxide comprises from 2–10 wt.% of the total catalyst.

18. The catalyst prepared as in claim 14 wherein the catalytic metal oxide is selected from the group consisting of the oxides of tungsten and niobium.

19. The catalyst prepared as in claim 18 wherein the catalytic metal oxide is tungsten oxide.

20. The catalyst prepared as in claim 15 wherein the catalytic metal oxide comprises from 0.5 to 25 wt.% of the total catalyst.

21. The catalyst prepared as in claim 20 wherein the catalytic metal oxide comprises from 2 to 10 wt.% of the total catalyst.

22. The catalyst prepared as in claim 12 wherein the steaming is conducted at a temperature of from 800° to 1200° C.

23. A method for preparing an acid catalyst, which catalyst comprises a catalytic metal oxide component selected from the group consisting of oxides of niobium, tungsten, and mixtures thereof, and tungsten or niobium oxides in combination with one or more additional metal oxides selected from the group consisting of tantalum oxide, hafnium oxide, chromium oxide, titanium oxide and zirconium oxide supported on an inorganic refractory metal oxide support, which is not itself an acid cracking catalyst, which method comprises depositing on the refractory metal oxide support a catalytic metal oxide precursor salt, converting the catalytic metal oxide precursor salt to metal oxide and subjecting the supported catalyst composite prior to use to a steam atmosphere at a temperature of from 600° to 1200° C.

24. The method of claim 23 wherein the refractory metal oxide is itself in initially a precursor salt wherein the catalytic metal oxide precursor salt and the refractory metal oxide support precursor salt are intimately mixed and the mixture is converted to the respective oxides.

25. The method of claim 23 wherein the catalytic metal oxide is tungsten oxide and niobium oxide.

26. The method of claim 23 wherein the catalytic metal oxide precursor salts are deposited on the inorganic refractory metal oxide support from aqueous or nonaqueous solution.

27. The method of claim 23 wherein the catalytic metal oxide precursor salt is deposited on the refractory metal oxide support from aqueous or alcohol solution.

28. The method of claim 23 wherein the steaming is conducted in an atmosphere comprising from 0.1 to 100% steam, the balance being inert gas.

29. The method of claim 23 wherein the inorganic refractory metal oxide support has a surface area of from 10 to 500 m$^2$/g.

30. The method of claim 23 wherein the refractory metal oxide support is selected from the group consisting of η-alumina, γ-alumina, α-alumina, zirconia, boria, thoria, magnesia, zirconium titanate, titania, chromia, silica, kieselguhr and mixtures thereof.

31. The method of claim 30 wherein the refractory metal oxide support is alumina.

32. The catalyst preparation method of claim 1 wherein said steaming temperature ranges from between about 800° and 1200° C.

33. The catalyst preparation of claim 32 wherein said catalyst contains one or more promoter materials selected from the group consisting of oxides of barium, calcium and magnesium.

34. The acid catalyst of claim 12 wherein said catalyst contains one or more promoter materials selected from the group consisting of oxides of barium, calcium and magnesium.

35. The method of claim 31 wherein said steaming temperature ranges from between about 800° and 1200° C.

36. The method of claim 35 wherein the catalyst contains one or more promoter materials selected from the group consisting of oxides of barium, calcium and magnesium.

37. The catalyst preparation method of claim 1 wherein the catalytic metal oxide component is selected from the group consisting of tungsten oxides in combination with one or more additional metal oxides selected from the group consisting of tantalum oxide, hafnium oxide, chromium oxide, titanium oxide and zirconium oxide, and niobium oxides in combination with one or more additional metal oxides selected from the group consisting of tantalum oxide, hafnium oxide, chromium oxide, titanium oxide and zirconium oxide.

38. The catalyst preparation method of claim 1 wherein the catalytic metal oxide component is selected from the group consisting of tungsten oxides in combination with one or more additional metal oxides selected from the group consisting of tantalum oxide, hafnium oxide, chromium oxide, titanium oxide and zirconium oxide.

39. The catalyst preparation method of claim 1 wherein the catalytic metal oxide component is selected from the group consisting of niobium oxides in combination with one or more additional metal oxides selected from the group consisting of tantalum oxide, hafnium oxide, chromium oxide, titanium oxide and zirconium oxide.

40. The catalyst preparation method of claim 37, 38 or 39 wherein the inorganic refractory oxide support is alumina.

41. The catalyst prepared as in claim 12 wherein the catalytic metal oxide component is selected from the group consisting of tungsten oxides in combination with one or more additional metal oxides selected from the group consisting of tantalum oxide, hafnium oxide, chromium oxide, titanium oxide and zirconium oxide, and niobium oxides in combination with one or more additional metal oxides selected from the group consisting of tantalum oxide, hafnium oxide, chromium oxide, titanium oxide and zirconium oxide.

42. The catalyst prepared as in claim 12 wherein the catalytic metal oxide component is selected from the group consisting of tungsten oxides in combination with one or more additional metal oxides selected from the group consisting of tantalum oxide, hafnium oxide, chromium oxide, titanium oxide and zirconium oxide.

43. The catalyst prepared as in claim 12 wherein the catalytic metal oxide component is selected from the group consisting of niobium oxide in combination with one or more additional metal oxides selected from the group consisting of tantalum oxide, hafnium oxide, chromium oxide, titanium oxide and zirconium oxide.

44. The catalyst prepared as in claims 35, 36 or 37 wherein the inorganic refractory metal oxide base is alumina.

45. The catalyst prepared as in claim 35 wherein the ratio of tungsten oxide or niobium oxide to the additional metal oxide is in the order of 1:1.

46. The catalyst prepared as in claim 45 wherein the ratio is in the order of 9:1.

47. The catalyst prepared as in claim 42 wherein the ratio of tungsten oxide to the additional metal oxide is in the order of 1:1.

48. The catalyst prepared as in claim 42 wherein the ratio of tungsten oxide to the additional metal oxide is in the order of 9:1.

49. The catalyst prepared as in claim 43 wherein the ratio of niobium oxide to the additional metal oxide is in the order of 1:1.

50. The catalyst prepared as in claim 43 wherein the ratio of niobium oxide to the additional metal oxide is in the order of 9:1.

51. The catalyst prepared as in claim 44 wherein the ratio of tungsten oxide or niobium oxide to the additional metal oxide is in the order of 1:1.

52. The catalyst prepared as in claim 44 wherein the ratio of tungsten oxide or niobium oxide to the additional metal oxide is in the order of 9:1.

53. The method of claim 23 wherein the catalytic metal oxide component is selected from the group consisting of tungsten oxides in combination with one or more additional metal oxides selected from the group consisting of tantalum oxide, hafnium oxide, chromium oxide, titanium oxide and zirconium oxide, and niobium oxides in combination with one or more additional metal oxides selected from the group consisting of tantalum oxide, hafnium oxide, chromium oxide, titanium oxide and zirconium oxide.

54. The method of claim 23 wherein the catalytic metal oxide component is selected from the group consisting of tungsten oxides in combination with one or more additional metal oxides selected from the group consisting of tantalum oxide, hafnium oxide, chromium oxide, titanium oxide, and zirconium oxide.

55. The method of claim 23 wherein the catalytic metal oxide component is selected from the group consisting of niobium oxides in combination with one or more additional metal oxides selected from the group consisting of tantalum oxide, hafnium oxide, chromium oxide, titanium oxide, and zirconium oxide.

56. The method of claims 53, 54, or 55 wherein the inorganic refractory oxide support is alumina.

57. An acid catalyst comprising a catalytic metal oxide component selected from the group consisting of tungsten oxide or niobium oxide in combination with one or more additional metal oxides selected from the group consisting of tantalum oxide, hafnium oxide, chromium oxide, titanium oxide, and zirconium oxide, supported on an inorganic refractory metal oxide base which is not itself an acid cracking catalyst.

58. The catalyst of claim 57 wherein the metal oxide in combination with the additional metal oxide is tungsten oxide.

59. The catalyst of claim 57 wherein the metal oxide in combination with the additional metal oxide is niobium oxide.

60. The catalyst of claims 57, 58 or 59 wherein the inorganic refractory metal oxide support is alumina.

61. The catalyst of claim 57 wherein the ratio of tungsten oxide or niobium oxide to the additional metal oxide is in the order of 1:1 to 9:1.

62. The catalyst of claim 58 wherein the ratio of tungsten oxide to the additional metal oxide is in the order of 1:1 to 9:1.

63. The catalyst of claim 59 wherein the ratio of niobium oxide to the additional metal oxide is in the order of 1:1 to 9:1.

64. The catalyst of claim 60 wherein the ratio of tungsten oxide or niobium oxide to the additional metal oxide is in the order of 1:1 to 9:1.

65. The acid catalyst of claim 57 which additionally contains one or more promoter materials selected from the group consisting of oxides of barium, calcium and magnesium.

* * * * *